(12) United States Patent
Krell et al.

(10) Patent No.: US 9,356,932 B2
(45) Date of Patent: May 31, 2016

(54) DYNAMICALLY APPLYING A CONTROL POLICY TO A NETWORK

(75) Inventors: Sherry Krell, Sacramento, CA (US); Rebecca M. Ballesteros, Roseville, CA (US); Adrian Cowham, Fair Oaks, CA (US); John M. Green, Rocklin, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 1165 days.

(21) Appl. No.: 13/146,148

(22) PCT Filed: Jan. 30, 2009

(86) PCT No.: PCT/US2009/032573
§ 371 (c)(1),
(2), (4) Date: Jul. 25, 2011

(87) PCT Pub. No.: WO2010/087845
PCT Pub. Date: Aug. 5, 2010

(65) Prior Publication Data
US 2011/0289551 A1    Nov. 24, 2011

(51) Int. Cl.
*G06F 17/00* (2006.01)
*H04L 29/06* (2006.01)

(52) U.S. Cl.
CPC ............. *H04L 63/10* (2013.01); *H04L 63/20* (2013.01)

(58) Field of Classification Search
CPC ....... H04L 63/20; H04L 63/10; H04L 63/102; H04L 63/105
USPC .......................................................... 726/1
See application file for complete search history.

(56) References Cited

U.S. PATENT DOCUMENTS

| 8,739,245 | B2 * | 5/2014 | Salowey et al. ................... 726/3 |
| 2003/0115484 | A1 | 6/2003 | Moriconi et al. |
| 2005/0027837 | A1 | 2/2005 | Roese et al. |
| 2005/0108568 | A1 | 5/2005 | Bussiere et al. |
| 2006/0026682 | A1 * | 2/2006 | Zakas .............................. 726/22 |
| 2006/0075472 | A1 * | 4/2006 | Sanda et al. ....................... 726/3 |
| 2007/0199061 | A1 | 8/2007 | Byres et al. |
| 2008/0092223 | A1 | 4/2008 | Setia et al. |

FOREIGN PATENT DOCUMENTS

| CN | 101018119 A | 8/2007 |
| CN | 101072138 A | 11/2007 |
| CN | 101128044 A | 2/2008 |
| EP | 1484886 A2 | 12/2004 |

OTHER PUBLICATIONS

English translation (machine-generated) of Abstract from Chinese Patent Publication No. CN101018119A [retrieved on Sep. 17, 2013], Retrieved from the Internet: <http://worldwide.espacenet.com/publicationDetails/biblio?DB=EPODOC&II=0&ND=3&adjacent=true&locale=en_EP&FT=D&date=20070815&CC=CN& NR=101018119A&KC=A>.
English translation (machine-generated) of Abstract from Chinese Patent Publication No. CN101072138A [retrieved on Sep. 17, 2013], Retrieved from the Internet: <http://worldwide.espacenet.com/publicationDetails/biblio?DB=EPODOC&II=0&ND=3&adjacent=true&locale=en_EP&FT=D&date=20071114&CC=CN& NR=101072138A&KC=A>.
International Search Report, PCT/US2009/032573, Oct. 20, 2009.
Office Action, CN Application No. 200980158440.7, Date: Aug. 16, 2013, pp. 1-10.
Office Action, CN Application No. 200980158440.7, Date: Jun. 13, 2014, pp. 1-7.
Extended European Search Report, EP Application No. 09839418.2, Date: Apr. 18, 2016, pp. 1-7.

* cited by examiner

*Primary Examiner* — William Goodchild
(74) *Attorney, Agent, or Firm* — Hewlett Packard Enterprise Patent Department (57) ABSTRACT

A method of dynamically applying a control policy to a network is described. A network layer of a plurality of network layers associated with user traffic is determined. A portion of a control policy corresponding to the network layer and the user traffic is accessed. Then, the portion is sent to a security device associated with the network layer, the portion being configured to be applied by the security device to the network layer and the user traffic.

15 Claims, 5 Drawing Sheets

DYNAMICALLY APPLYING A CONTROL POLICY TO A NETWORK

FIELD

The field of the present invention relates to computing systems. More particularly, embodiments of the present invention relate to network security management.

BACKGROUND

Technological advances have led to the use of increasingly larger and complex networks with an ever increasing number of network systems as an integral part of organizational operations. Many network systems routinely receive, process and/or store data of a sensitive and/or confidential nature. Users are often provided with access to a network via external network access points to retrieve and/or exchange data with network systems within the network. The increased use of such external network access points has in many cases rendered networks increasingly vulnerable to attacks by malicious users.

Attacks on networks are growing in frequency and sophistication. The sensitive nature of data that is routinely stored in such networks often attracts malicious users or hackers that seek to gain access to the sensitive data and/or confidential data. In some cases, malicious users seek access to networks and network systems with the intention of corrupting the network and/or network systems. Examples of mechanisms that are often used by malicious users to inflict damage on a network include, but are not limited to, viruses, worms, spiders, crawlers and Trojans.

The increasing frequency of attacks on networks has often lead to an increase on the demands made on network administrators to find methods that are more efficient to protect the network from these attacks.

BRIEF DESCRIPTION OF THE DRAWINGS

The accompanying drawings, which are incorporated in and form a part of this specification, illustrate embodiments of the present technology for a system for dynamically applying a user access control policy to a network and, together with the description, serve to explain principles discussed below.

The drawings referred to in this description should not be understood as being drawn to scale unless specifically noted.

DESCRIPTION OF EMBODIMENTS

Reference will now be made in detail to embodiments of the present technology, examples of which are illustrated in the accompanying drawings. While the present technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific details are set forth in order to provide a thorough understanding of embodiment of the present technology. However, embodiments of the present technology may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "determining", "accessing", "sending", "detecting", "continuing", "identifying", "utilizing", or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. Embodiments of the present technology are also well suited to the use of other computer systems such as, for example, optical and mechanical computers.

Overview of Discussion

Embodiments in accordance with the present technology pertain to a system for dynamically applying an identity-based security policy across all layers of a network. As a user's traffic moves across the network, embodiments of the present technology apply a centralized security policy for a user to each layer of the network. For example, a user's switch security policy would be applied as the user's traffic enters a switch. In another example, the user's network firewall security policy would be applied as the user's traffic enters a firewall.

This method of applying an identity-based security policy allows a network administrator to configure a centrally managed security policy that applies to all layers of a network. The network administrator may easily deploy the appropriate portion of the security policy to all of the corresponding security devices coupled with an associated network layer. Thus, a single security policy for a user may be applied across multiple network layers.

Managing Security in a Network

Figure 1:
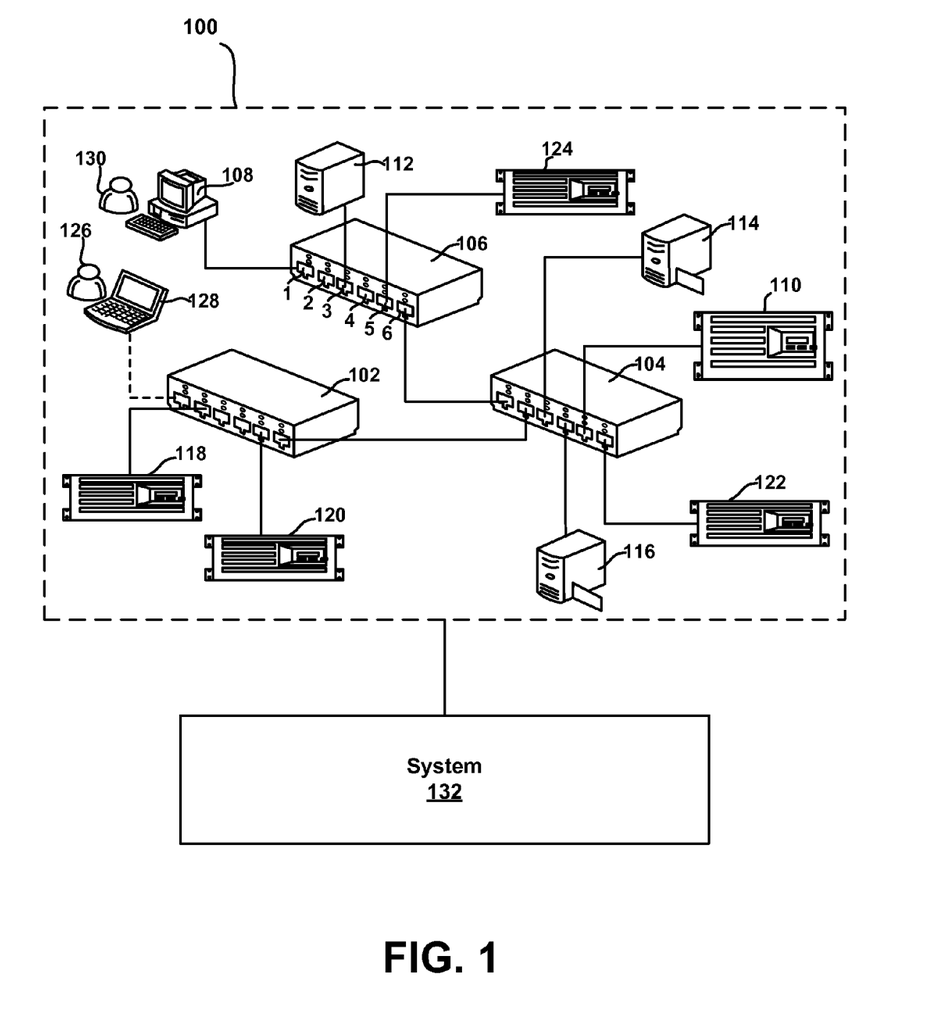
FIG. 1 is a block diagram of an example network in which an example system for dynamically applying a control policy to a network may be implemented, in accordance with embodiments of the present technology.

FIG. 1 is a block diagram representation of an example of a network 100 where one embodiment of a system 132 for dynamically applying a user access control policy may be implemented is shown. The example network 100 generally includes first, second and third network switch systems 102, 104, 106, a network administrator system 108, a network management system 110, first, second and third server systems 112, 114, 116, and first, second, third and fourth threat assessment systems 118, 120, 122, 124. An external system 128, such as a laptop, is communicatively coupled with network 100.

First, second and third network switch systems 102, 104, 106 are communicatively coupled with each other and generally communicatively coupled with network 100. Each of first, second and third network switch systems 102, 104, 106, respectively, includes a plurality of data ports 1, 2, 3, 4, 5, 6. Communicative coupling is established between first network switch system 102 and second network switch system 104 via a communication channel between data port 6 of first network switch system 102 and data port 2 of second network switch system 104. Communicative coupling is established between second network switch system 104 and third network switch system 106 via a communication channel between data port 1 of second network switch system 104 and data port 6 of third network switch system 106.

In one embodiment, one or more network switch systems 102, 104, 106 includes one or more edge interconnect data ports. Data port 1 of first network switch system 102 is communicatively coupled with external system 128 and is an example of an edge interconnect data port. In one embodiment, one or more network switch systems are configured as edge interconnect network switch systems where the data ports 1, 2, 3, 4, 5, 6 are all configured as edge interconnect data ports.

In one embodiment, one or more network switch systems 102, 104, 106 includes an embedded threat assessment system in the form of a switch based trap system. The switch based trap system is configured to detect one or more selected data anomalies and raises a data anomaly event upon detection of the one of the selected data anomalies. In one embodiment, the switch based trap system issues an anomaly notification to network management system 110 upon detection of one of the selected data anomalies. In one embodiment, the switch based trap system issues an anomaly notification to network administrator system 108 upon detection of one of the selected data anomalies. In one embodiment, the switch based trap system is a virus throttling (VT) system.

In one embodiment, one or more data ports, 1, 2, 3, 4, 5, 6 of one or more of network switch systems 102, 104, 106 are configured as mirror source ports. In one embodiment, one or more data ports 1, 2, 3, 4, 5, 6 of one or more network switch systems 102, 104, 106 are configured as mirror destination ports. In one embodiment, one or more data ports 1, 2, 3, 4, 5, 6 of one or more network switch systems 102, 104, 106 are configured as local mirror source ports. In one embodiment, one or more data ports 1, 2, 3, 4, 5, 6 of one or more network switch systems 102, 104, 106 are configured as local mirror destination ports. In one embodiment, one or more data ports 1, 2, 3, 4, 5, 6 of one or more network switch systems 102, 104, 106 are configured as remote mirror source ports. In one embodiment, one or more data ports 1, 2, 3, 4, 5, 6 of one or more network switch systems 102, 104, 106 are configured as remote mirror destination ports.

While network switch systems having six data ports have been described, network switch systems used in a network may have a fewer or a greater number of data ports. For example, many network switch systems have well over 100 data ports. Also, while a number of different types of network switch systems having the described configurations and/or features have been described, the network switch systems may be configured using alternative network switch system configurations and/or features. Furthermore, while a network has been described as having three network switch systems, a fewer or greater number of network switch systems may be used.

Threat assessment systems 118, 120, 122, 124 generally monitor network data to identify data anomalies that may pose a security threat to network 100 and evaluate any identified data anomalies. In one embodiment, threat assessment system 118, 120, 122, 124 implements mitigation actions in response to the detection of a data anomaly that may pose a potential security threat to network 100. There are a number of different types of threat assessment systems 118, 120, 122, 124 available for use in network 100. Examples of such threat assessment systems 118, 120, 122, 124, include but are not limited to, intrusion detection systems (IDS), intrusion prevention systems (IPS), unified threat management (UTM) systems and firewall systems (FW). In an example network 100, first and third threat assessment systems 118 and 122, respectively, are intrusion detection systems (IDS), second threat assessment system 120 is an intrusion prevention system (IPS), and fourth threat assessment system 124 is a unified threat management (UTM) system.

First and second threat assessment systems 118 and 120, respectively, are communicatively coupled with network 100 via first network switch system 102 and third and fourth threat assessment systems 122 and 124, respectively, are communicatively coupled to network 100 via second and third network switch systems 104 and 106, respectively. More specifically, first threat assessment system 118 is communicatively coupled with network 100 via a communication channel between first threat assessment system 118 and data port 2 of first network switch system 102. Second threat assessment system 120 is communicatively coupled with network 100 via a communication channel between second threat assessment system 120 and data port 5 of first network switch system 102. Third threat assessment system 122 is communicatively coupled with network 100 via a communication channel between third threat assessment system 122 and data port 6 of second network switch system 104. Fourth threat assessment system 124 is communicatively coupled with network 100 via a communication channel between fourth threat assessment system 124 and data port 5 of third network switch system 106.

In one embodiment, one or more threat assessment systems 118, 120, 122, 124 issues an anomaly event notification to network administrator system 108 upon the detection of selected data anomalies. In one embodiment, one or more threat assessment systems 118, 120, 122, 124 issues an evaluation notification to network administrator system 108 upon completion of an evaluation of a detected data anomaly. In one embodiment, one or more threat assessment systems 118, 120, 122, 124 issues an anomaly event notification to network management system 110 upon the detection of a data anomaly. In one embodiment, one or more threat assessment systems 118, 120, 122, 124 issues an evaluation notification to network management system 110 upon completion of an evaluation of a detected data anomaly.

While a number of different types of threat assessment systems have been described, other types of threat assessment systems may be used. Also, while a network has been described as having four threat assessment systems, a fewer or greater number of threat assessment systems may be used. Furthermore, while a particular network configuration has been described for the threat assessment systems, alternative network configurations may be employed.

In one embodiment, upon the detection of selected data anomalies by network management system 110, network management system 110 issues a data anomaly assessment request to a selected threat assessment system 118, 120, 122, 124 to provide an assessment of the detected data anomaly. In one embodiment, upon the detection of selected data anomalies by network management system 110, network management system 110 issues a data mirroring command to a selected network system to mirror network data associated with the detected data anomaly to a selected threat assessment system 118, 120, 122, 124. In one embodiment, upon the detection of selected data anomalies by network management system 110, network management system 110 identifies the threat type posed by the detected network data anomaly, identifies a threat assessment system 118, 120, 122, 124 that specializes in the evaluation of an identified threat type and issues a data mirroring command to a selected network system to mirror network data associated with the data anomaly to the identified threat assessment system 118, 120, 122, 124.

Network management system 110 generally manages network operations including network security operations. In one embodiment, network management system 110 includes a network immunity management system where the network immunity management system generally manages network security operations. In one embodiment, network management system 110 is a network immunity management (NIM) system type of network management system that generally manages network security operations. Additional types of network management systems are used to manage other types of network operations. In one embodiment, network management system 110 includes an embedded threat assessment system. In one embodiment, the embedded threat assessment system is a network behavior anomaly detection (NBAD) system. Network management system 110 is communicatively coupled with network 100 via second network switch 104. More specifically, network management system 110 is communicatively coupled with network 100 via a communication channel between network management system 110 and data port 5 of second network switch system 104. Network management system 110 will be described in greater detail with reference to FIG. 2 below.

Network administrator 130 generally manages network operations including network security operations via network administrator system 108. Network administrator system 108 is communicatively coupled with network 100 via third network switch 106. More specifically, network administrator system 108 is communicatively coupled with network 100 via a communication channel between network administrator system 108 and data port 1 of third network switch system 106.

In one embodiment, network administrator 130 is provided with the option of manually defining and/or amending security policies via network administrator system 108. In one embodiment, anomaly notifications are received at network administrator system 108. In one embodiment, network administrator 130 is provided with the option of selectively manually enforcing selected security polices via network administrator system 108. In one embodiment, network administrator 130 is provided with the option of selectively manually implementing one or more mitigation responses to selected data anomalies via network administrator system 108. In one embodiment, network administrator 130 is provided with the option of configuring selected network systems via network administrator system 108.

In one embodiment, network administrator 130 is provided with the option of configuring individual network switch systems 102, 104, 106 via network administrator system 108. In one embodiment, network administrator 130 is provided with the option of configuring individual data ports 1, 2, 3, 4, 5, 6 of individual network switch systems 102, 104, 106 via network administrator system 108. In one embodiment, network administrator 130 is provided with the option of configuring individual data ports 1, 2, 3, 4, 5, 6 as mirror source data ports and as mirror destination data ports via network administrator system 108. In one embodiment, network administrator 130 is provided with the option of configuring individual data ports 1, 2, 3, 4, 5, 6 as local mirror source data ports and as local mirror destination data ports via network administrator system 108. In one embodiment, network administrator 130 is provided with the option of configuring individual data ports 1, 2, 3, 4, 5, 6, as remote mirror source data ports and as remote mirror destination data ports via network administrator system 108. While a number of different network administrations functions that may be performed by network administrator 130 via network administrator system 108 have been described, other network administrations functions may also be performed by network administrator 130 via network administrator system 108.

First server system 112 is communicatively coupled with network 100 via third network switch 106 and second and third server systems 114 and 116, respectively, are communicatively coupled with network 100 via second network switch 104. More specifically, first server system 112 is communicatively coupled with network 100 via a communication channel between first server system 112 and data port 3 of third network switch system 106. Second server system 114 is communicatively coupled with network 100 via a communication channel between second server system 114 and data port 3 of second network switch system 104. Third server system 116 is communicatively coupled with network 100 via a communication channel between third server system 116 and data port 4 of second network switch system 104. In the example network 100, first server system 112 handles data requiring a relatively low level of network security while second and third server systems 114 and 116, respectively, handle relatively sensitive financial data and require a relatively higher level of network security. While one network configuration including specific types of server systems configured within the network in a particular manner have been described, other types of server systems may be used in a network. Also, while one network configuration of server systems has been described alternative network configurations may be used. Furthermore, while three servers have been described as a part of the network, a fewer or greater number of servers may be used.

A user 126 has used external system 128, such as a laptop, to establish communicative coupling with network 100. External system 128 has established communicative coupling with network 100 via a communication channel established between external system 128 and data port 1 of first network switch system 102. Data port 1 is an edge interconnect data port. A user as used in the description includes human users as well as automated agents. One example of such an automated agent is a bot.

In one embodiment, communication channels established between network systems within network 100 are wireless communication channels. In one embodiment, communication channels established between network systems within network 100 are wired communication channels. In one embodiment, communication channels established between network systems within network 100 are a combination of wireless communication channels and wired communication channels.

In one embodiment, communication channels established between external system 128 and network 100 are via wireless communication channels. In one embodiment, communication channels established between external system 128 and network 100 are via wired communication channels. In one embodiment, communication channels established between external system 128 and network 100 are via a combination of wireless communication channels and wired communication channels.

While one particular configuration of network 100 where one embodiment of managing security in network 100 may be implemented has been described, embodiments of managing security in a network may be implemented in networks having alternative configurations. Furthermore, embodiments of managing security in a network may be implemented in networks including a fewer or greater number of types of network systems and including a fewer or greater number of the described network systems.

Figure 2:
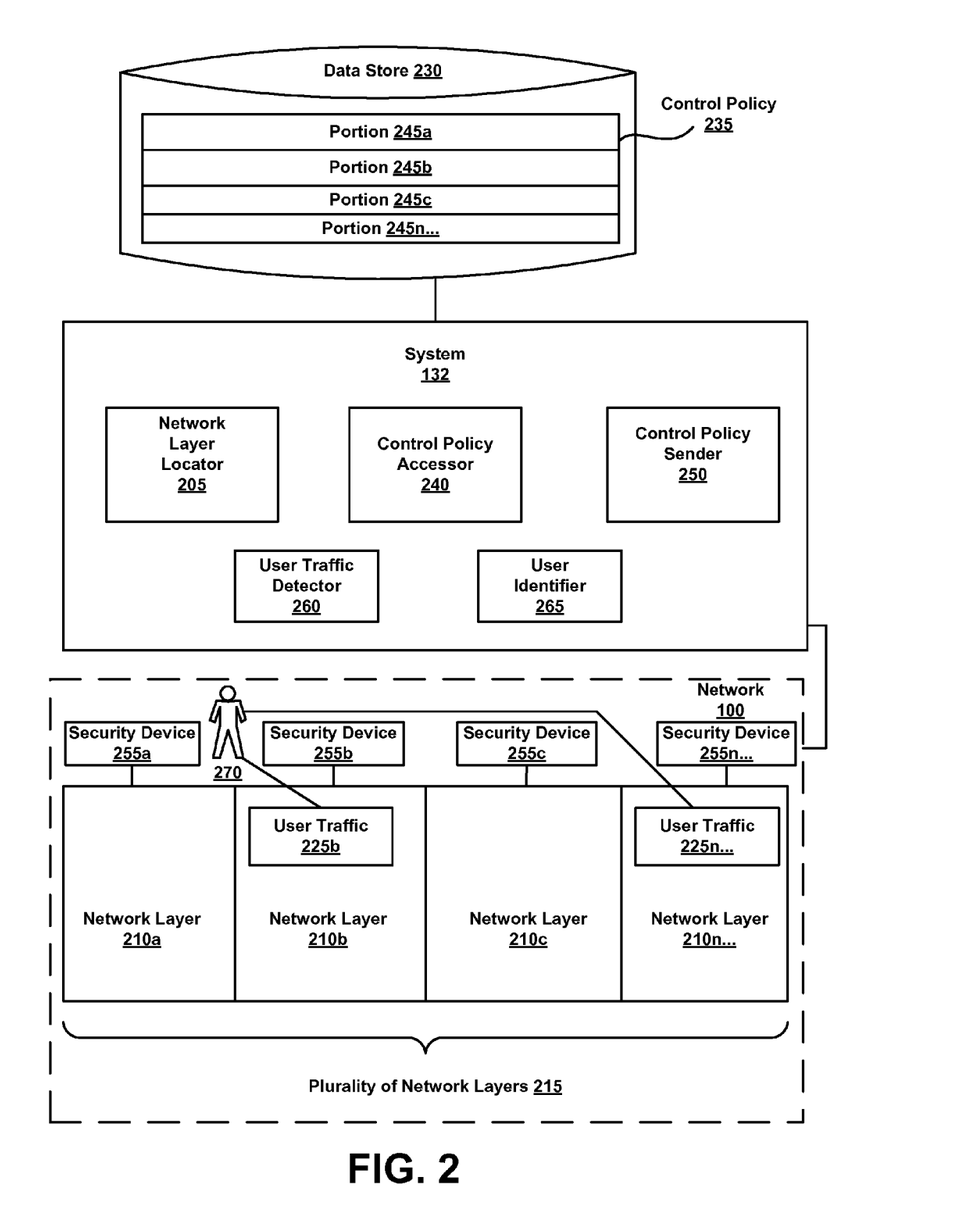
FIG. 2 is a block diagram of an example system for dynamically applying a control policy to a network, in accordance with embodiments of the present technology.

Example Architecture of a System for Dynamically Applying a User Access Control Policy to a Network FIG. 2 is a block diagram of an example system 132 for dynamically applying a user access control policy to network 100, in accordance with embodiments of the present technology. System 132 is coupled with, wired and/or wirelessly, network 100. System 132 includes network layer locator 205, control policy accessor 240, control policy sender 250, and data store 230. Embodiments of the present technology may further include user traffic detector 260 and user identifier 265.

In one embodiment, network layers 210*a*, 210*b*, 210*c*, and 210*n* . . . (210*a*-210*n* . . . ) comprise a plurality of network layers 215 within network 100. One network layer may be a firewall layer, while another network layer may be a layer upon which a user 270 logs in. In another embodiment, a network layer may represent network switches 102, 104, 106. Each network layer accommodates user traffic. User traffic refers to one or more actions user 270 performs on one of the plurality of network layers 215.

In one embodiment, data store 230 is internal to system 132. In another embodiment, data store 230 may be coupled with, wired or wirelessly, and external to system 132. Data store 230 is configured for storing a control policy 235 that may be divided into portions 245*a*, 245*b*, 245*c*, and 245*n* . . . (245*a*-245*n* . . . ). Each network layer of plurality of network layers 215 has a specific portion related thereto. Additionally, it is appreciated that there may be more or less portions than the number of network layers within network 100. In one embodiment, data store 230 is configured for storing a plurality of control policies, including control policy 235.

In one embodiment, control policy 235 comprises at least one access restriction instruction associated with user 270 and user traffic 225*b* and the network layer 210*b* upon which user traffic 225*b* is operating. While only one access restriction instruction is described herein, it is understood that control policy 235 may contain more than one access restriction instruction. An access restriction instruction may include a description regarding instructions limiting a user's access to a certain network layer within a network.

In one embodiment, an access restriction instruction may be a network location restriction for user 270. For example, the access restriction instruction may indicate that user 270 is only permitted access to a portion of network layer 210*b*, such as ports 5 and 6 of the ports 1, 2, 3, 4, 5, and 6. In another embodiment, an access restriction instruction may be a network bandwidth restriction. For example, the access restriction instruction may indicate that user 270 is only permitted to use a pre-specified amount of bandwidth on network layer 210*b*. In one embodiment, an access restriction instruction may be a duration restriction for user 270. For example, the access restriction instruction may indicate that user 270 is only permitted access to network layer 210*b* via port 1 for two minutes at a time.

In one embodiment, each network layer 210*a*-210*n* . . . has a security device 255*a* coupled therewith. In one embodiment, one or more of the security devices 255*a*, 255*b*, 255*c*, and 255*n* . . . is an access control device. The access control device functions to enforce a pre-defined access level for a user's network layer.

As will be described herein, embodiments of the present technology provide for the administration of an identity-based control policy across multiple layers of a network. Using well-known networking authentication/authorization protocol, system 132 sends control policy information to security devices to enforce a pre-defined access level for a user on the network. System 132 intelligently determines what portion of the control policy, depending on the network layer at which a user is operating, should be given to the security device. Additionally, system 132 allows updates of control policies to be dynamically applied as the user moves around the network.

Example Operation of Network Security System

More generally, in embodiments in accordance with the present technology, system 132 is utilized to dynamically share a single control policy across multiple network layers. This allows a network administrator to configure a centrally managed control policy that applies to all layers of a network. Additionally, the network administrator may easily deploy the appropriate portion of the control policy to each of the corresponding security devices on the network.

Referring to FIG. 2, in one embodiment, user traffic detector 260 detects user traffic. For example, user traffic detector 260 may detect user traffic 225*b* and user traffic 225*n* . . . . Referring still to FIG. 2, in one embodiment, network layer locator 205 determines a network layer of a plurality of network layers associated with user traffic. For example, network layer locator 205 may determine that user traffic 225*b* is occurring at switch 204. Switch 204 comprises network layer 210*b*. Therefore, network layer locator 205 determines that network layer 210*b* is associated with user traffic 225*b*.

In one embodiment, determining a network layer associated with user traffic is performed while the user traffic is entering network layer. However, in another embodiment, determining a network layer associated with user traffic is performed after the user traffic has entered the network layer.

In one embodiment, determining a network layer associated with user traffic comprises identifying a user creating the user traffic. For example, user 270 may be responsible for user traffic 225*b*. Part of determining the network layer associated with user traffic 225 includes identifying that user 270 is responsible for user traffic 225*b*. In one embodiment, identifying user 270 may include mapping user 270 to an associated network address via technology known in the field.

Referring to FIG. 2, in one embodiment, once the network layer upon which user traffic is operating is determined, then control policy accessor 240 accesses a portion of the control policy corresponding to network layer 210*b* and user traffic 225*b*. For example, a portion of a control policy corresponds to a network layer and user traffic when that portion's access restriction instruction thereon refers to network layer 210*b* and user traffic 225*b*.

Referring still to FIG. 2, in one embodiment, control policy sender 250 sends the accessed portion 245*b* to a security device associated with network layer 210*b*. For example, in FIG. 2, security device 255*b* is coupled with network layer 210*b*. Portion 245*b* is configured to be applied to network layer 210*b* and user traffic 225*b* security device 255*b*. Thus, security device 255*b* may then apply portion 245*b* of control policy 235 to network layer 210*b* and user traffic 225*b*.

In one embodiment, system 132 provides that portion 245b is automatically sent to security device 255b. In another embodiment, system 132 provides that portion 245b is sent to security device 255b in response to instructions from an administrator of network 100, such as administrator 130.

In one embodiment, the network layer locator 205, control policy accessor 240, and control policy sender 250 function continuously while user traffic is still be detected. For example, while user traffic 225b is still being detected by user traffic detector 260, then network layer locator 205 continues to determine network layer 210b associated with user traffic 225b, control policy accessor 240 continues to access portion 245b corresponding to network layer 210b and user traffic 225b, and control policy sender 250 continues to send portion 245b to security device 255b. Finally, security device 255b continues to apply portion 245b to network layer 210b and user traffic 225b.

Figure 3:
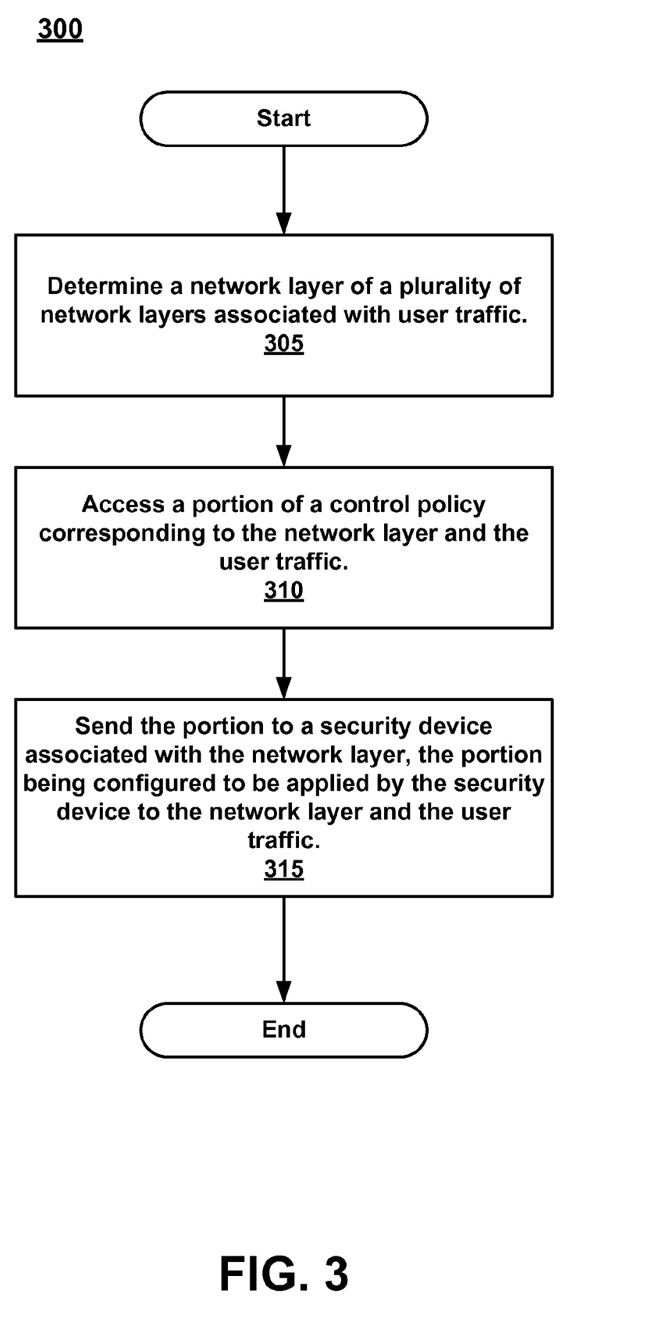
FIG. 3 is a flowchart of an example method for dynamically applying a control policy to a network, in accordance with embodiments of the present technology.

Referring now to 300 of FIG. 3, a flowchart of an example computer-implemented method for dynamically applying a control policy to a network, in accordance with embodiments of the present technology is shown.

Referring to 305 of FIG. 3 and as described herein, in one embodiment of the present technology, network layer 210b, of plurality of network layers 215, that is associated with user traffic 225b is determined. Referring now to 310 of FIG. 3 and as described herein, in one embodiment portion 245b of control policy 235 corresponding to network layer 210b and user traffic 225 is accessed.

Referring to 315 of FIG. 3 and as described herein, in one embodiment, portion 245b is sent to security device 255b associated with network layer 210b. Portion 245b is configured to be applied by security device 255b to network layer 210b and user traffic 225b.

Example Computer System Environment

Figure 4:
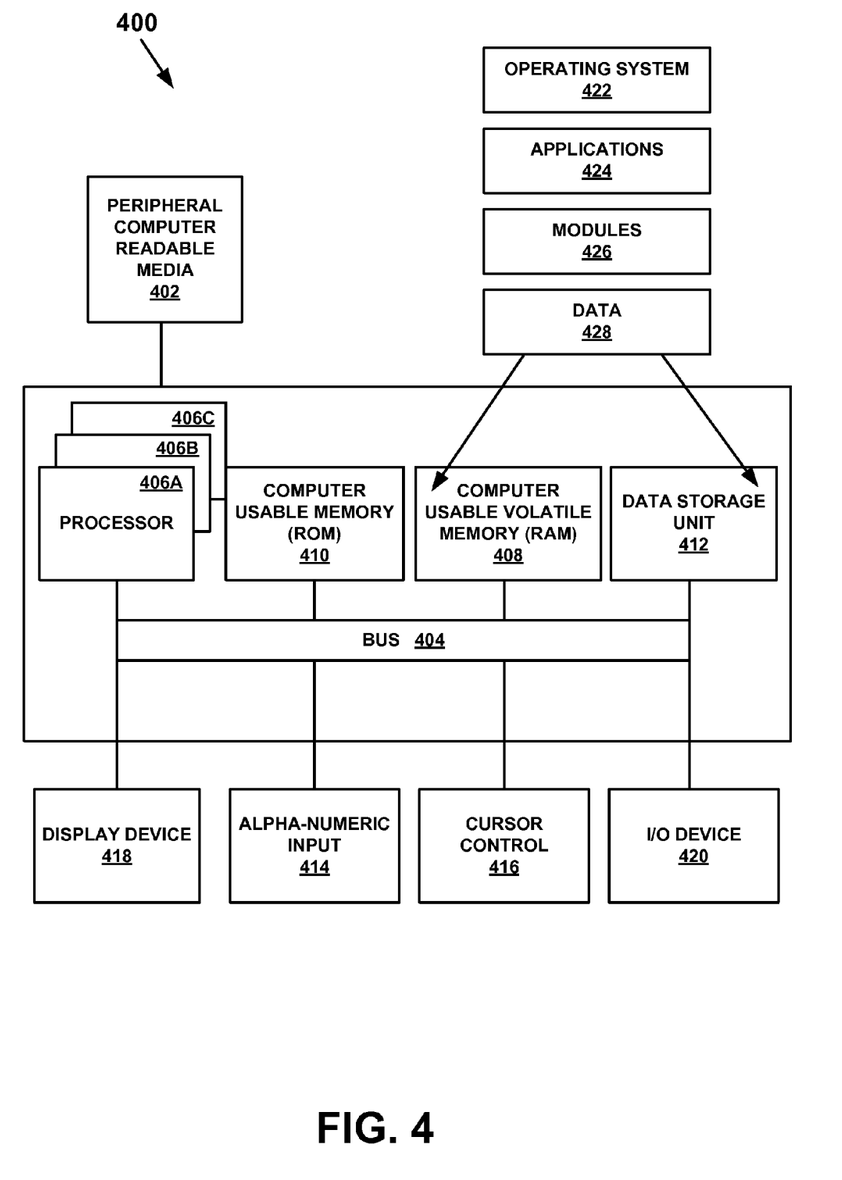
FIG. 4 is a diagram of an example computer system used for dynamically applying a control policy to a network, in accordance with embodiments of the present technology.

FIG. 4 illustrates an example computer system 400 used in accordance with embodiments of the present technology. It is appreciated that system 400 of FIG. 4 is an example only and that embodiments of the present technology can operate on or within a number of different computer systems including general purpose networked computer systems, embedded computer systems, routers, switches, server devices, user devices, various intermediate devices/artifacts, stand alone computer systems, and the like. As shown in FIG. 4, computer system 400 of FIG. 4 is well adapted to having peripheral computer readable media 402 such as, for example, a compact disc, and the like coupled therewith.

System 400 of FIG. 4 includes an address/data bus 404 for communicating information, and a processor 406A coupled to bus 404 for processing information and instructions. As depicted in FIG. 4, system 400 is also well suited to a multi-processor environment in which a plurality of processors 406A, 406B, and 406C are present. Conversely, system 400 is also well suited to having a single processor such as, for example, processor 406A. Processors 406A, 406B, and 406C may be any of various types of microprocessors. System 400 also includes data storage features such as a computer usable volatile memory 408, e.g. random access memory (RAM), coupled to bus 404 for storing information and instructions for processors 406A, 406B, and 406C.

System 400 also includes computer usable non-volatile memory 410, e.g. read only memory (ROM), coupled to bus 404 for storing static information and instructions for processors 406A, 406B, and 406C. Also present in system 400 is a data storage unit 412 (e.g., a magnetic or optical disk and disk drive) coupled to bus 404 for storing information and instructions. System 400 also includes an optional alpha-numeric input device 614 including alphanumeric and function keys coupled to bus 404 for communicating information and command selections to processor 406A or processors 406A, 406B, and 406C. System 400 also includes an optional cursor control device 416 coupled to bus 404 for communicating user input information and command selections to processor 406A or processors 406A, 406B, and 406C. System 400 also includes an optional display device 418 coupled to bus 404 for displaying information.

Referring still to FIG. 4, optional display device 418 of FIG. 4 may be a liquid crystal device, cathode ray tube, plasma display device or other display device suitable for creating graphic images and alpha-numeric characters recognizable to a user. Optional cursor control device 416 allows the computer user to dynamically signal the movement of a visible symbol (cursor) on a display screen of display device 418. Many implementations of cursor control device 416 are known in the art including a trackball, mouse, touch pad, joystick or special keys on alpha-numeric input device 414 capable of signaling movement of a given direction or manner of displacement. Alternatively, it will be appreciated that a cursor can be directed and/or activated via input from alpha-numeric input device 414 using special keys and key sequence commands.

System 400 is also well suited to having a cursor directed by other means such as, for example, voice commands. System 400 also includes an I/O device 420 for coupling system 400 with external entities.

Referring still to FIG. 4, various other components are depicted for system 400. Specifically, when present, an operating system 422, applications 424, modules 426, and data 428 are shown as typically residing in one or some combination of computer usable volatile memory 408, e.g. random access memory (RAM), and data storage unit 412. However, it is appreciated that in some embodiments, operating system 422 may be stored in other locations such as on a network or on a flash drive; and that further, operating system 422 may be accessed from a remote location via, for example, a coupling to the internet. In one embodiment, the present invention, for example, is stored as an application 424 or module 426 in memory locations within RAM 408 and memory areas within data storage unit 412.

Computing system 400 is only one example of a suitable computing environment and is not intended to suggest any limitation as to the scope of use or functionality of embodiments of the present technology. Neither should the computing environment 400 be interpreted as having any dependency or requirement relating to any one or combination of components illustrated in the example computing system 400.

Embodiments of the present technology may be described in the general context of computer-executable instructions, such as program modules, being executed by a computer. Generally, program modules include routines, programs, objects, components, data structures, etc., that perform particular tasks or implement particular abstract data types. Embodiments of the present technology may also be practiced in distributed computing environments where tasks are performed by remote processing devices that are linked through a communications network. In a distributed computing environment, program modules may be located in both local and remote computer-storage media including memory-storage devices.

Figure 5:
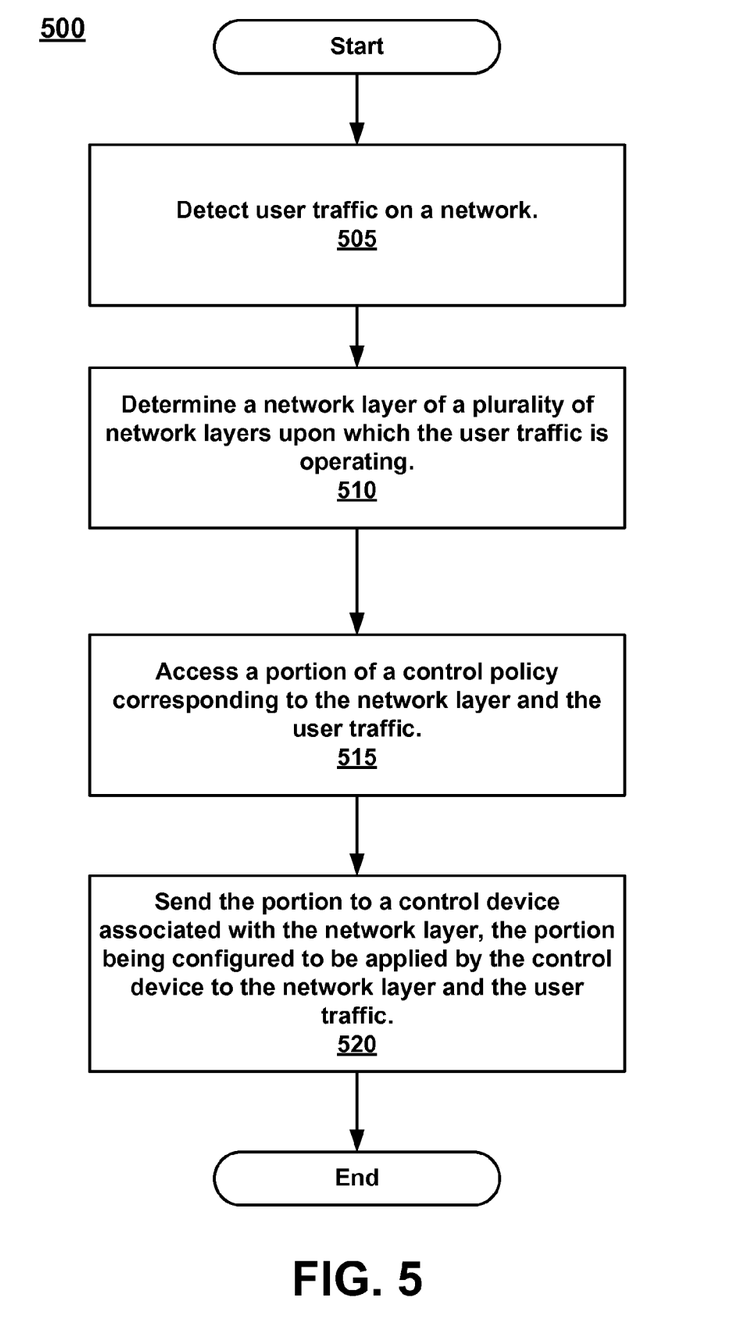
FIG. 5 is a flowchart of an example method for dynamically applying a control policy to a network, in accordance with embodiments of the present technology.

FIG. 5 is a flowchart of an example method for dynamically applying a control policy to a network, in accordance with embodiments of the present technology. In one embodiment, process 500 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. In one embodiment, process 500 is performed by system 132 of FIG. 2.

Referring to 505 of FIG. 5, in one embodiment, user traffic 225b on network 100 is detected. Referring to 510 of FIG. 5, in one embodiment, network layer 210b of plurality of network layers 215 upon which user traffic 225b is operating is determined. In one embodiment, determining comprises identifying user 270 associated with user traffic 225b.

Referring to 515 of FIG. 5, in one embodiment, portion 245b of control policy 235 corresponding to network layer 210b and user traffic 225b is accessed. Referring to 520 of FIG. 5, in one embodiment, portion 245b is sent to a control device associated with network layer 210b. Portion 245b is configured to be applied by the control device to network layer 210b and user traffic 225b.

Thus, embodiments of the present technology enable the administration of an identity-based control policy across multiple layers of a network. Control policies may be dynamically applied as a user moves around the network. Additionally, this centralized control policy may be applied to the user at the network level, regardless of where or how the user connects to the network.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method of dynamically applying an identity-based centralized security policy for a user to network layers of a network, said computer implemented method comprising:
   detecting user traffic on a network, wherein one or more network layers of a plurality of network layers of said network accommodate said user traffic, wherein said plurality of network layers comprise network switches, and wherein said user traffic comprises one or more actions performed on said one or more network layers of a plurality of network layers of said network;
   identifying a user performing said one or more actions of said user traffic;
   determining a network layer of said plurality of network layers on which said user traffic is detected;
   accessing an identity of said user,
   accessing, at a database, an identity-based centralized security policy corresponding to said network layer, wherein said identity-based centralized security policy is associated with said identity of said user and comprises a plurality of portions, wherein each network layer of said one or more network layers relates to a portion of said plurality of portions that is different from any other portion of said plurality of portions, and wherein said each portion comprises at least one access restriction instruction associated with said user, said user traffic and said network layer upon which said user traffic is detected, wherein said at least one access restriction instruction comprises at least one instruction limiting access of said user to said network layer, wherein said at least one instruction comprises at least one of:
      a network bandwidth restriction for said user, wherein said network bandwidth restriction for said user provides an instruction permitting user a pre-specified amount of bandwidth on said network layer; and
      a duration restriction for said user, wherein said duration restriction for said user provides an instruction that said user is permitted access to said network layer for a pre-specified time limit; and
   sending a portion of said identity-based centralized security policy that corresponds to said network layer upon which said user traffic is detected to a security device associated with said network layer, said portion of said identity-based centralized security policy being configured to be applied by said security device to said network layer and to said user traffic.

2. The computer implemented method of claim 1, further comprising:
   continuing said determining, said accessing, and said sending while said user traffic is being detected.

3. The computer implemented method of claim 1, further comprising:
   determining a network layer of a plurality of network layers associated with said user traffic as said user traffic enters said network layer.

4. The computer implemented method of claim 1, further comprising:
   determining a network layer of a plurality of network layers associated with said user traffic after said user traffic enters said network layer.

5. The computer implemented method of claim 1, wherein said sending comprises:
   automatically sending said portion of said identity-based centralized security policy that corresponds to said network layer upon which said user traffic is detected to a security device associated with said network layer, said portion of said identity-based centralized security policy being configured to be applied by said security device to said user traffic and to said network layer.

6. The computer implemented method of claim 1, further comprising:
   in response to instructions from an administrator of said network, sending said portion of said network to said security device associated with said network layer, said portion being configured to be applied by said security device to said user traffic and to said network layer.

7. The computer implemented method of claim 1, further comprising:
   utilizing an access control device as said security device.

8. A system for dynamically applying an identity-based centralized security policy for a user to network layers of a network, said system comprising:
   a user traffic detector configured for detecting user traffic on a network, wherein one or more network layers of a plurality of network layers of said network accommodate said user traffic, wherein said plurality of network layers comprise network switches, and wherein said user traffic comprises one or more actions performed on said one or more network layers of a plurality of network layers of said network;
   a user identifier configure for identifying a user performing said one or more actions of said user traffic;
   a network layer locator configured for determining a network layer of said plurality of network layers on which said user traffic is detected;

a data store configured for storing a control policy;

a control policy accessor configured for accessing an identity of said user and accessing, at said data store, an identity-based centralized security policy corresponding to said network layer wherein said identity-based centralized security policy is associated with said identity of said user and comprises a plurality of portions, wherein each network layer of said one or more network layers relates to a portion of said plurality of portions that is different from any other portion of said plurality of portions, and wherein said each portion comprises at least one access restriction instruction associated with said user, said user traffic and said network layer upon which said user traffic is detected, wherein said at least one access restriction instruction comprises at least one instruction limiting access of said user to said network layer, wherein said at least one instruction comprises at least one of:

a network bandwidth restriction for said user, wherein said network bandwidth restriction for said user provides an instruction permitting user a pre-specified amount of bandwidth on said network layer; and     a duration restriction for said user, wherein said duration restriction for said user provides an instruction that said user is permitted access to said network layer for a ore-specified time limit; and a control policy sender configured for sending a portion of said identity-based centralized security policy that corresponds to said network layer upon which said user traffic is detected to a security device associated with said network layer, said portion of said identity-based centralized security policy being configured to be applied by said security device to said network layer and to said user traffic.

9. The system of claim 8, wherein said data store is configured for storing a plurality of control policies.

10. The system of claim 8, wherein said security device is an access control device.

11. A non-transitory computer usable storage medium comprising instructions that when executed cause a computer system to perform a method of dynamically applying an identity-based centralized security policy for a user to network layers of a network, said method comprising:

detecting user traffic on a network, wherein one or more network layers of a plurality of network layers of said network accommodate said user traffic, wherein said plurality of network layers comprise network switches, and wherein said user traffic comprises one or more actions performed on said one or more network layers of a plurality of network layers of said network;

identifying a user performing said one or more actions of said user traffic;

determining a network layer of said plurality of network layers upon which said user traffic is detected;

accessing an identity of said user;

accessing, at a database, an identity-based centralized security policy corresponding to said network layer, wherein said identity-based centralized security policy is associated with said identity of said user and comprises a plurality of portions, wherein each network later of said one or more network layers relates to a portion of said plurality of portions that is different from any other portion of said plurality of portions, and wherein said each portion comprises at least one access restriction instruction associated with said user, said user traffic and said network layer upon which said user traffic is detected, wherein said at least one access restriction instruction comprises at least one instruction limiting access of said user to said network layer, wherein said at least one instruction comprises at least one of:

a network bandwidth restriction for said user, wherein said network bandwidth restriction for said user provides an instruction permitting user a pre-specified amount of bandwidth on said network layer; and     a duration restriction for said user, wherein said duration restriction for said user provides an instruction that said user is permitted access to said network layer for a pre-specified time limit; and sending a portion of said identity-based centralized security policy that corresponds to said network layer upon which said user traffic is detected to a control device associated with said network layer, said portion of said identity-based centralized security policy being configured to be applied by said access control device to said network layer and to said user traffic.

12. The non-transitory computer usable storage medium of claim 11 comprising instructions that when executed cause a commuter system to perform said method, further comprising:

continuing said determining, said accessing, and said sending as long as user traffic is detected.

13. The non-transitory computer usable storage medium of claim 11 comprising instructions that when executed cause a computer system to perform said method, wherein said sending comprises:

automatically sending said portion to a security device associated with said network layer, said portion being configured to be applied by said security device to said user traffic and said network layer.

14. The non-transitory computer usable storage medium of claim 11 comprising instructions that when executed cause a computer system to perform said method, further comprising:

in response to instructions from an administrator of said network, sending said portion of said network to a security device associated with said network layer, said portion being configured to be applied by said security device to said user traffic and said network layer.

15. The non-transitory computer usable storage medium of claim 11 comprising instructions that when executed cause a computer system to perform said method further comprising:

utilizing a control device as said security device.

\* \* \* \* \*